United States Patent
Itoh et al.

(10) Patent No.: US 6,805,468 B2
(45) Date of Patent: Oct. 19, 2004

(54) SURFACE LIGHT SOURCE DEVICE AND LIQUID CRYSTAL DISPLAY DEVICE USING IT

(75) Inventors: Atsushi Itoh, Kumamoto (JP); Ikuo Ogo, Kumamoto (JP); Shigeru Yachi, Kumamoto (JP)

(73) Assignee: Kabushiki Kaisha Advanced Display, Kumamoto (JP)

(*) Notice: Subject to any disclaimer, the term of this patent is extended or adjusted under 35 U.S.C. 154(b) by 0 days.

(21) Appl. No.: 10/271,787

(22) Filed: Oct. 17, 2002

(65) Prior Publication Data

US 2003/0076669 A1 Apr. 24, 2003

(30) Foreign Application Priority Data

Oct. 22, 2001 (JP) ..................... P2001-323696

(51) Int. Cl.[7] ................................. B60Q 3/04
(52) U.S. Cl. .............. 362/362; 362/560; 362/558; 362/552; 362/330; 362/26; 362/27; 362/800
(58) Field of Search .................. 362/362, 31, 560, 362/558, 552, 551, 330, 333, 26, 27, 800

(56) References Cited

U.S. PATENT DOCUMENTS 5,420,761 A * 5/1995 DuNah et al. ................ 362/31
6,601,962 B1 * 8/2003 Ehara et al. .................. 362/31

FOREIGN PATENT DOCUMENTS

| JP | 2000-231816 | 8/2000 |
|----|-------------|--------|
| JP | 2001-14922 | 1/2001 |
| JP | 2001-35229 | 2/2001 |
| JP | 2001-43720 | 2/2001 |
| JP | 2001-43721 | 2/2001 |
| JP | 2001-101916 | 4/2001 |
| JP | 2001-118416 | 4/2001 |

* cited by examiner

*Primary Examiner*—Stephen Husar
*Assistant Examiner*—Bertrand Zeade
(74) *Attorney, Agent, or Firm*—McDermott Will & Emery LLP

(57) ABSTRACT

A prism member is interposed between an LED board and a light incidence surface of a light guide plate. The prism member includes a prism sheet consisting of minute prisms that are arranged along the LED board and that have a function of refracting light that is emitted from each LED and thereby inputting, to the light incidence surface, refracted light that is scattered to both sides in the longitudinal direction of the light incidence surface. As a result, chrominance or luminance unevenness can be prevented even if the distance between the LED board and the light incidence surface is short.

15 Claims, 9 Drawing Sheets

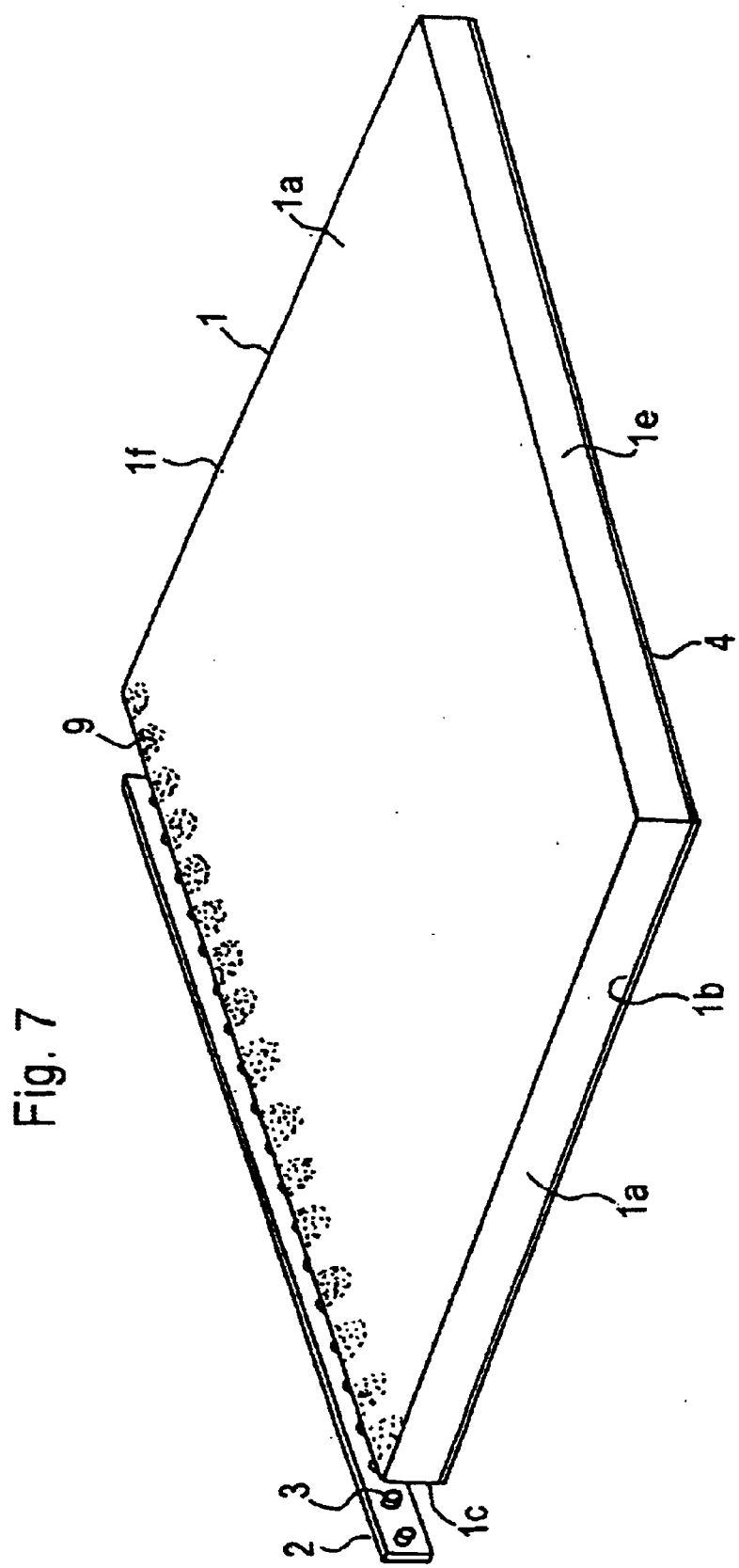

SURFACE LIGHT SOURCE DEVICE AND LIQUID CRYSTAL DISPLAY DEVICE USING IT

BACKGROUND OF THE INVENTION

1. Field of the Invention

The present invention relates to a surface light source device using point light sources such as light-emitting diodes and a liquid crystal display device using such a surface light source device.

2. Description of the Related Art

Various kinds of flat display devices have been proposed and commercialized that include devices utilizing the birefringence of a liquid crystal, devices using electroluminescence or plasma light emission, and devices in which minute electron guns or optical reflectors are arrayed in the same number as the number of pixels. Among those kinds of flat display devices, at present, the device using a liquid crystal is put in practice use widely.

In general, a liquid crystal display device is composed of a liquid crystal panel in which a liquid crystal is held between two substrates that are opposed to each other, circuit units that drives the liquid crystal panel, an illumination device for illuminating the liquid crystal panel in the display area with uniform light, and structural members that keep the liquid crystal panel, the circuit units, and the illumination device in a prescribed positional relationship. Liquid crystal display devices for certain purposes are not provided with any illumination devices but use external light (reflection type).

Illumination devices for a liquid crystal display device are classified into two types, that is, a front light in which the liquid crystal panel is illuminated from its front side and a backlight in which the liquid crystal panel is illuminated from its back side. A backlight is used in large-size liquid crystal devices of 10 inches or more, and conventionally a cold cathode fluorescent tube is used as its light source.

FIG. 9 shows a conventional backlight using a cold cathode fluorescent tube. A light guide plate 1 made of a transparent material has a pair of major surfaces 1a and 1b that are opposed to each other. The one major surface 1a is made a light-emitting surface (the major surface 1a will be hereinafter referred to as "light-emitting surface 1a") and the other major surface 1b is provided with a reflection sheet 4 that is a light reflecting means. At least one side surface (in FIG. 9, a side surface 1c) of the light guide plate 1 serves as a long and narrow light incidence surface (the side surface 1c will be hereinafter referred to as "light incidence surface 1c"). At least one lamp (cold cathode fluorescent tube) 10 is disposed close to the light incidence surface 1c. Although not shown in FIG. 9, a plurality of optical sheets for effective use of light are disposed above the light-emitting surface 1a and a reflection member for gathering light into the light incidence surface 1c is disposed around the lamp 10. The light guide plate 1 is mostly made of PMMA (poly methyl methacrylate), PC (polycarbonate), or glass each of which has large light transmittance.

Light that is emitted from the lamp 10 enters the light guide plate 1 through the light incidence surface 1c, travels through the light guide plate 1, and is output uniformly from the light-emitting surface 1a by virtue of a print formed on the light guide plate 1 and other means.

However, cold cathode fluorescent tubes used in conventional backlights employ mercury and hence have difficulty in taking proper measures against recent environmental problems. Cold cathode fluorescent tubes have another problem that the luminance lowers as the mercury is consumed.

On the other hand, in recent years, backlights and front lights using LEDs (light-emitting diodes) instead of a cold cathode fluorescent tube have been developed for small-size liquid crystal devices for cellular phones. Small-size liquid crystal devices that require only several LEDs mainly use expensive white LEDs. However, it is difficult for large-size liquid crystal display devices that require a lot of LEDs to use expensive white LEDs; at present, they cannot use any other light sources than a cold cathode fluorescent tube. To use LEDs for a large-size liquid crystal display device with a low cost, it is necessary to combine monochrome LEDs (e.g., red, green, and blue LEDs) to obtain white light instead of using white LEDs.

FIG. 10 illustrates a problem that arises when LEDs are used instead of the lamp 10 in a conventional large-size backlight. Components in FIG. 10 having the same or corresponding components in FIG. 9 are given the same reference symbols as the latter.

As shown in FIG. 10, where an LED board 2 having a plurality of LEDs 3 is disposed close to the light incidence surface 1c of the light guide plate 1, since the LEDs 3 are point light sources, the quantity of light that is incident on the light incidence surface 1c increases as the position comes closer to each LED 3 and only portions of the light-emitting surface 1a that are close to the respective LEDs 3 are bright. Therefore, where LEDs 3 of a plurality of colors are used, chrominance unevenness occurs in portions of the light-emitting surface 1a that are close to the LEDs 3 in such a manner each portion assumes a color corresponding to the color of the closest LED 3. Also where white LEDs 3 are used, similarly, only portions of the light-emitting surface 1a that are close to the respective LEDs 3 are bright, which means luminance unevenness. In FIG. 10, reference numeral 11 denotes such chrominance or luminance unevenness. Such chrominance or luminance unevenness 11 is a problem that is fatal to a backlight for a liquid crystal display device.

A simplest, effective method for solving the chrominance or luminance unevenness 11 is to increase the distance between the LED board 2 and the light incidence surface 1c of the light guide plate 1. However, recent liquid crystal display devices have been reduced in frame width and the distance between the light incidence surface 1c and the corresponding outer surface of the liquid crystal display device is now as short as about 10 mm. It is therefore difficult to increase the distance between the LED board 2 and the light incidence surface 1c. There is another problem that designing and manufacturing different LED boards 2 for individual sizes and types of liquid crystal display devices is costly and hence makes it difficult to produce inexpensive liquid crystal display devices.

SUMMARY OF THE INVENTION

The present invention has been made to solve the above problems, and an object of the invention is therefore to provide an inexpensive surface light source device that does not cause chrominance or luminance unevenness, can accommodate frame width reduction of a liquid crystal display device, and is environment-friendly, as well as an inexpensive liquid crystal display device that has superior display characteristics by virtue of the use of such a surface light source device.

A surface light source device according to the invention comprises a thin rectangular light guide plate, a light source assembly and a prism member. The thin rectangular light guide plate has a pair of major surfaces that are opposed to each other and a plurality of side surfaces that connect the pair of major surface. One of the major surfaces forms a light-emitting surface and the other major surface is provided with light reflecting means. One of the side surfaces forms a light incident surface. The light source assembly includes a plurality of point light sources so as to be arranged along a longitudinal direction of the light incidence surface of the light guide plate. The prism member is disposed between the light source assembly and the light incidence surface. The prism member includes a prism sheet consisting of a plurality of minute prisms that are arranged along an arrangement direction of the point light sources and that have a function of refracting light that is emitted from each of the point light sources and thereby inputting, to the light incidence surface, refracted light that is scattered to both sides in the longitudinal direction of the light incidence surface. The prism sheet is opposed to the point light sources and the light incidence surface with air layers interposed in between, respectively.

In this surface light source device according to the invention, since light beams emitted from the point light sources are scattered effectively, chrominance or luminance unevenness can be prevented even if the distance between the point light sources and the light incidence surface is short. Therefore, the invention can provide an inexpensive surface light source device capable of accommodating frame size reduction of a display device.

A surface light source device according to another aspect of the invention includes a thin rectangular light guide plate, a light source assembly and a light diffusion material. The thin rectangular light guide plate has a pair of major surfaces that are opposed to each other and four side surfaces that connect the pair of major surfaces. One of the major surfaces forms a light-emitting surface and the other major surface is provided with light reflecting means. One of the side surfaces forms a light incident surface. The light source assembly includes a plurality of point light sources that are disposed close to the light incident surface of the light guide plate so as to be arranged along a longitudinal direction of the light incidence surface. The light diffusing material is mixed in a light incidence portion of the light guide plate that is close to the light incidence surface.

In this surface light source device, the light diffusing material is mixed in a light incidence portion of the light guide plate that is close to the light incidence surface. By mixing the light diffusion material into a light incidence portion of the light guide plate that is close to the light incidence surface, light that has reached the light incidence surface after being refracted by the prism element and thereby scattered to both sides in the longitudinal direction of the light incidence surface can further be diffused in the portion close to the light incidence surface. This enhances the effect of preventing chrominance or luminance unevenness. Since light beams emitted from the point light sources are scattered effectively, chrominance or luminance unevenness can be prevented even if the distance between the point light sources and the light incidence surface is short. Therefore, the invention can provide an inexpensive surface light source device capable of accommodating frame size reduction of a display device.

The invention also provides a liquid crystal display device includes the surface light source device and a liquid cristal panel. The surface light source device is according to the invention and the liquid crystal panel is provided above the light-emitting surface of the light guide plate in the surface light source device.

An inexpensive liquid crystal display device that is free of chrominance or luminance unevenness and has superior display characteristics is obtained by disposing a liquid crystal panel above the surface light source device according to the invention.

BRIEF DESCRIPTION OF THE DRAWINGS

FIG. 7 is a perspective view of a backlight as a surface light source device according to a third embodiment of the invention;

DESCRIPTION OF THE PREFERRED EMBODIMENTS

Embodiments of the present invention will be hereinafter described with reference to the drawings.

Embodiment 1

Figure 1:
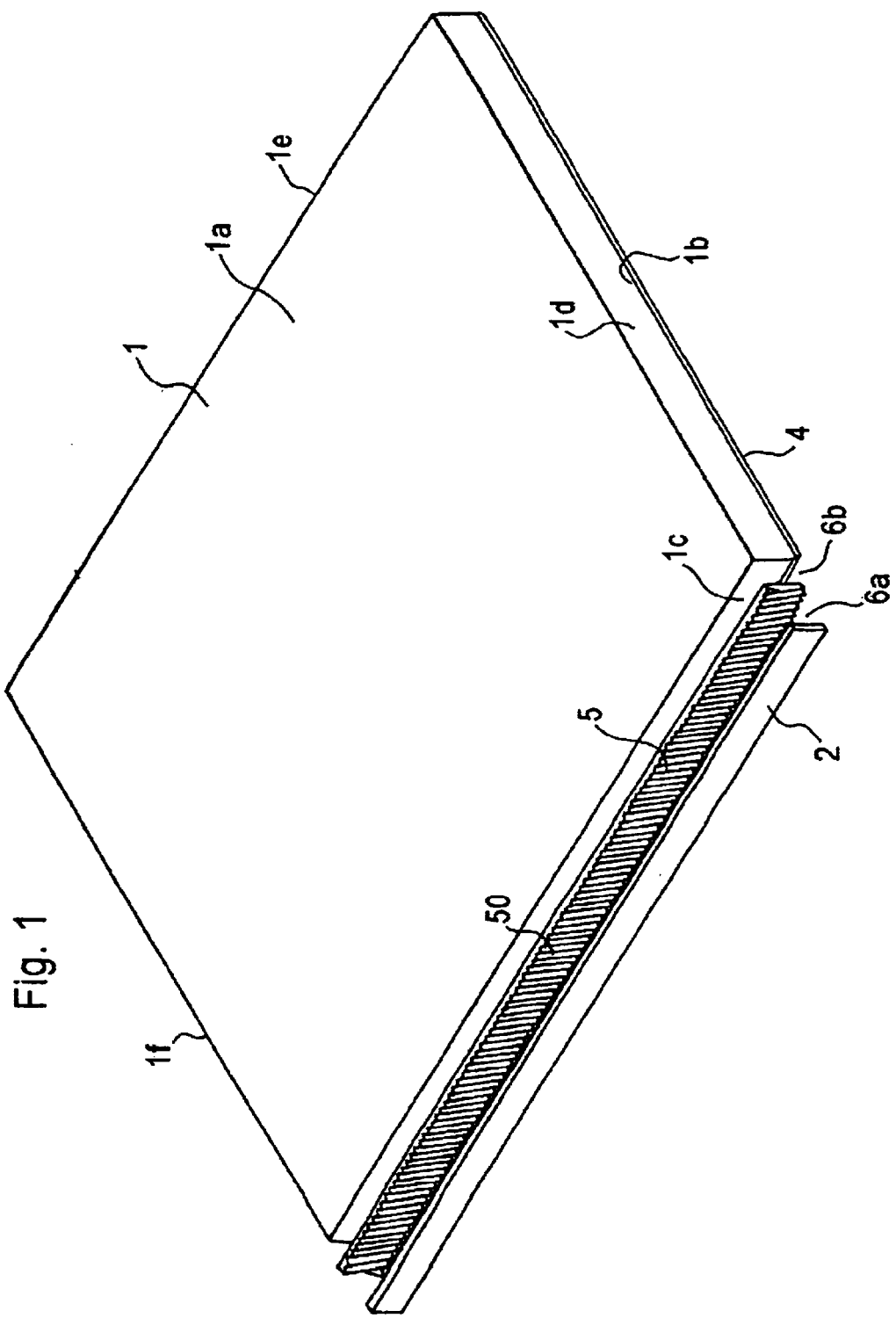
FIG. 1 is a perspective view of a backlight according to a first embodiment of the invention.

FIG. 1 is a perspective view of a backlight as a surface light source device according to a first embodiment of the invention. As shown in FIG. 1, the backlight according to the embodiment is mainly composed of a light guide plate 1, a light source assembly (a LED board 2), and a prism member 5. The light guide plate 1 is a thin rectangular parallelepiped plate having a pair of major surfaces 1a and 1b that are opposed to each other and four side surfaces 1c, 1d, 1e, and 1f. The one major surface 1a of the light guide plate 1 forms a light-emitting surface (the major surface 1a will be hereinafter referred to as "light-emitting surface 1a") and the other major surface 1b is provided with a reflection sheet 4 that is a light reflecting means. Although not shown in FIG. 1, a plurality of optical sheets for effective use of light are disposed above the light-emitting surface 1a. The light guide plate 1 is mostly made of PMMA (poly methyl methacrylate), PC (polycarbonate), or glass each of which has large light transmittance. At least one side surface (in FIG. 1, the side surface 1c) of the light guide plate 1 serves as a long and narrow light incidence surface (the side surface 1c will be hereinafter referred to as "light incidence surface 1c").

The light source assembly 2 is a LED board that is mounted with LEDs (light-emitting diodes, not shown) as point light sources is disposed close to the light incidence surface 1c. That is, the LEDs are arranged along the longitudinal direction of the light incidence surface 1c. The LEDs, which are a combination of inexpensive monochrome LEDs (e.g., red, green, and blue LEDs) are so arranged as to produce white light as a whole. The prism member 5 includes a prism sheet 50 made of a transparent resin is interposed between the LED board 2 and the light incidence surface 1c. The prism sheet 50 is opposed to the LED board 2 and the light incidence surface 1c with air layers 6a and 6b interposed in between, respectively.

Figure 2:
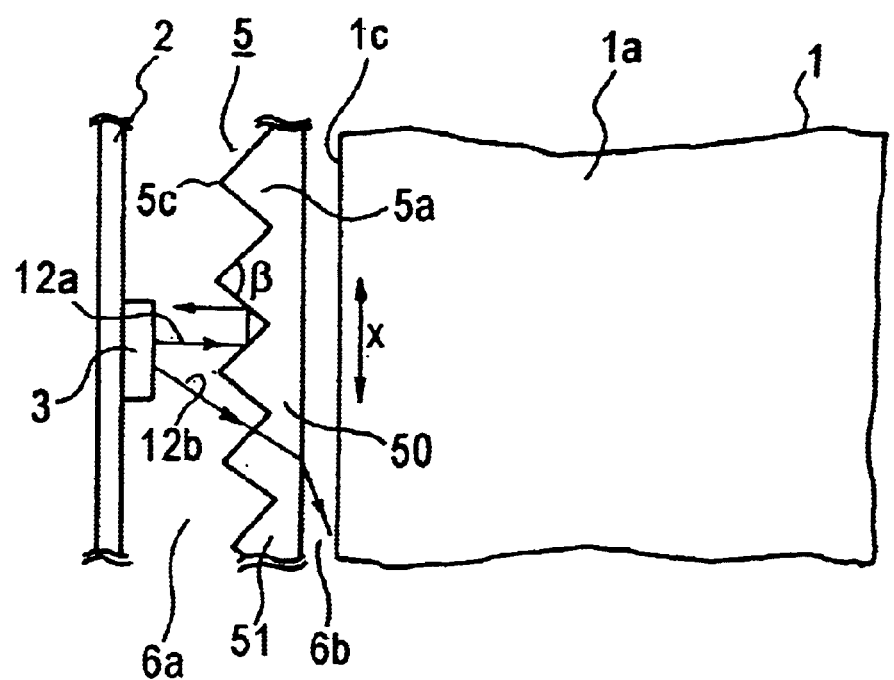
FIG. 2 is a top view schematically illustrating the function of a prism member of the backlight according to the first embodiment.

The structure and the optical function of the prism sheet 50 will be described below with reference to FIGS. 2 and 3. The prism sheet 50 is a sheet-like optical member that is arranged along the light incidence surface 1c of the light guide plate 1. The prism sheet 50 is composed of minute prisms 5a having a function of refracting light that is emitted from each LED 3 and thereby inputting, to the light incidence surface 1c, refracted light that is scattered to both sides in the longitudinal direction x (indicated by an arrow in FIG. 1) of the light incidence surface 1c. The prisms 5a that are integral with each other are arranged along the arrangement direction of the LEDs 3 on the LED board 2.

The prism sheet 50 has a pair of end faces 51 and 52 that are parallel with the light-emitting surface 1a. The cross section of each prism 5a taken parallel with the light-emitting surface 1a is generally substantial triangular and has an apex on the LED board 2 side. That is, the prisms 5a are oriented in such a manner that their ridge lines 5b are located on the LED board 2 side. As shown in FIG. 3, each ridge line 5b, which corresponds to the apex 5c in a cross section, forms a crossing angle $\alpha$ with the longitudinal direction x of the light incidence surface 1c. How to set the crossing angle a will be described later in detail.

Figure 3:
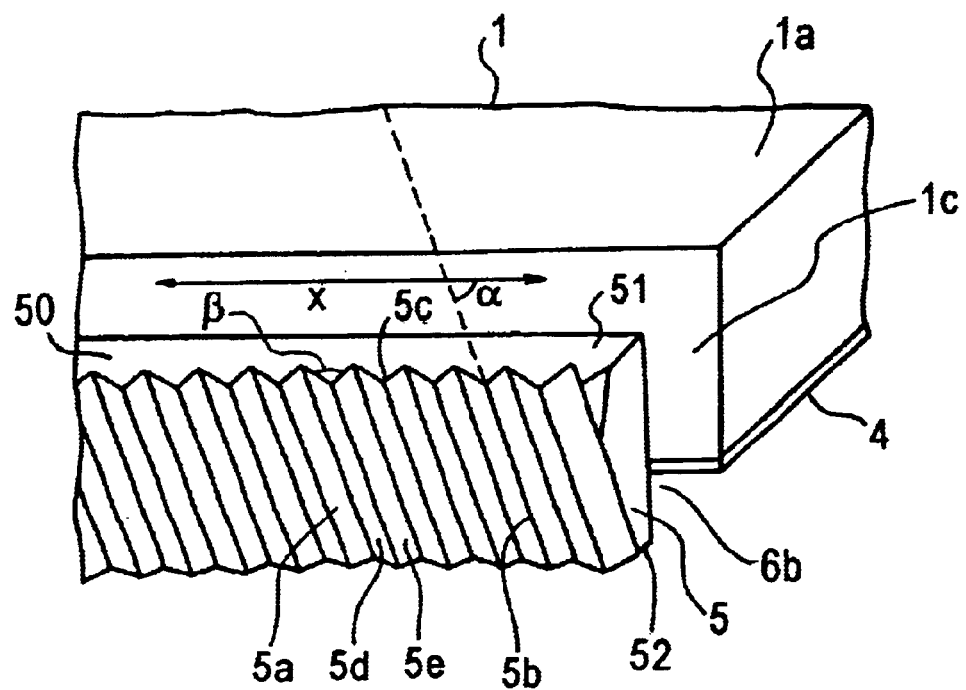
FIG. 3 is a perspective view showing part of the prism member of the backlight according to the first embodiment.

As shown in FIG. 3, the apex 5c of the ridge line 5b of each prism 5a has an apical angle $\beta$. In other words, in each prism 5a, the apical angle $\beta$ is formed by a pair of inclined surfaces 5d and 5e. In this embodiment, the apical angle $\beta$ is set at 90°±20°. If an LED 3 is assumed to be an ideal point light source, light that is incident on a prism 5a having an apical angle 90° is refracted or reflected and goes along paths shown in FIG. 2. More specifically, a ray 12a that is emitted from the LED 3 perpendicularly is changed in traveling direction by 180° by prisms 5a and hence does not pass through a portion of the prism member 5 that faces the LED 3. On the other hand, a ray 12b that is emitted from the LED 3 obliquely is bent by a prism 5a so as to go away from the perpendicular to the LED 3. In this manner, the light that is emitted from the LED 3 is expanded to a large extent in the longitudinal direction x of the light incidence surface 1c, whereby the light becomes weak in a portion of the light incidence surface 1c that faces the LED 3. However, if no light were incident on the portions of the light incidence surface 1c that faces the respective LEDs 3, portions of the light-emitting surface 1a that are close to the respective LEDs 3 would become dark to cause chrominance or luminance unevenness. To avoid this problem, it is desirable that the apical angle $\beta$ of the prism 5a be set in an approximate range of 90°±20°, the optimum value of the apical angle $\beta$ depending on the optical arrangement of the individual members. With this setting, of the light that is emitted from each LED and reaches the light incidence surface 1c, light that is incident on the portion of the light incidence surface 1c that faces the LED 3 is weakened properly, whereby chrominance or luminance unevenness can be prevented.

At the ridge lines 5b (singular points) of the prism member 5, light is not refracted in the desired direction to become abnormal light. Therefore, it is desirable that the number of ridge lines 5b be as small as possible. That is, it is desirable optically that the interval between the ridge lines 5b of prisms 5a adjacent to each other, that is, the pitch of the prisms 5a, be as long as possible. However, as the pitch is made longer, the height of the prisms 5a increases, which requires the LEDs 3 to be more distant from the light incidence surface 1c. In recent liquid crystal display devices in which the frame width is small, the distance between the light incidence surface 1c and the corresponding outer surface of the liquid crystal display device is as short as about 10 mm and hence it is difficult to set the distance between the LEDs 3 and the light incidence surface 1c long. It is desirable that the pitch of the prisms 5a of the prism member 5 be set at 1 mm or less. As a result, the prism member 5 assumes a thin sheet form, whereby the prism member 5 can be inserted without making the distance between the LEDs 3 and the light incidence surface 1c unduly long. This makes it possible to provide an inexpensive surface light source device capable of accommodating frame width reduction of a liquid crystal display device. However, if the distance between the LEDs 3 and the light incidence surface 1c can be set long, the prism member 5 need not assume a sheetlike form; it may be a block made of a transparent resin such as PMMA. In this case, the pitch of the prisms 5a can be set long.

Next, the crossing angle $\alpha$ between the ridge line 5b of each prism 5a of the prism member 5 and the longitudinal direction x of the light incidence surface 1c will be described with reference to FIG. 3. Since the purpose of the prism member 5 is to refract light and thereby scatter the light in the longitudinal direction x of the light incidence surface 1c, the most effective arrangement is that the crossing angle $\alpha$ between the ridge line 5b of each prism 5a and the longitudinal direction x of the light incidence surface 1c is set at 90°. However, the required scattering effect depends on the interval between the LEDs 3 and the distance between the LEDs 3 and the light incidence surface 1c. Therefore, it is conceivable to determine, each time, a distance relationship that provides a required scattering effect by making a prism member 5 having a crossing angle 90°. However, this method is not appropriate because it is costly and is not high in general versatility.

It is easier to adjust the scattering effect by adjusting the crossing angle a by inclining the ridge lines 5b of the prisms 5a in accordance with the interval between the LEDs 3 and the distance between the LEDs 3 and the light incidence surface 1c. Specifically, as the interval between the LEDs 3 increases, it is necessary to scatter light that is emitted from each LED 3 to a larger extent in the longitudinal direction x of the light incidence surface 1c and hence the optimum value of the crossing angle a becomes closer to 90°. Where the optimum value of the crossing angle $\alpha$ is close to 0°, a required degree of uniformity of light intensity can be attained by such a measure as roughening the light incidence surface 1c; therefore, where the optimum value of the crossing angle $\alpha$ is 30° or less, an inexpensive surface light source device can be formed less expensively by not using the prism member 5. It is therefore desirable that the crossing angle $\alpha$ between the ridge line 5b of each prism 5a of the prism member 5 and the longitudinal direction x of the light incidence surface 1c be in a range of 30° to 90°.

For the prism member 5 to exhibit the desired performance, it is necessary that the air layer 6b be provided between the light incidence surface 1c of the light guide plate 1 and the prism member 5. This requires a design that prevents contact between the prism member 5 and the light incidence surface 1c. Even with such a design, if the prism member 5 has a thin sheet form, it may contact the light incidence surface 1c when it is bent, for example. It is therefore desirable that the prism member 5 has a means for preventing contact between the prism member 5 and the light incidence surface 1c.

Figure 4:
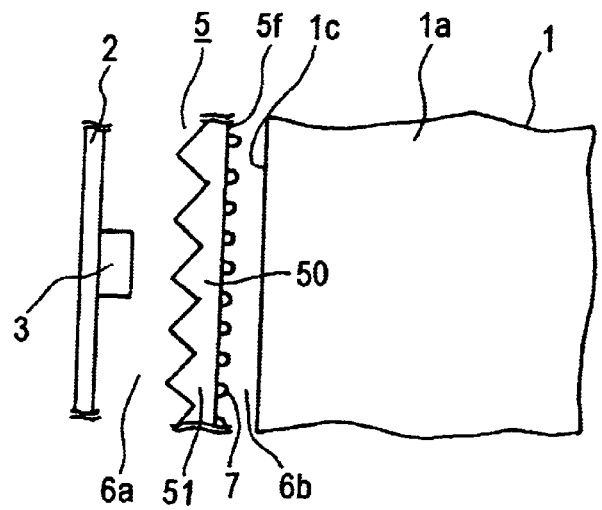
FIG. 4 is a top view showing part of the backlight according to the first embodiment.

FIG. 4 shows a specific example in which a back surface 5f of the prism member 5 that is opposed to the light incidence surface 1c is embossed (indicated by numeral 7) or beads are scattered on the back surface 5f. The contact preventing means provides a secondary effect of further scattering light that is emitted from each LED 3 to enhance the effect of preventing chrominance or luminance unevenness. Since the embossment 7 or the bead scattering is performed or provided to prevent contact between the prism member 5 and the light incidence surface 1c, it may be omitted if a proper mechanism capable of preventing contact can be designed.

According to this embodiment, by virtue of the function of the prism member 5 that is interposed between the light guide plate 1 and the LED board 2 that is mounted with the LEDs 3, light that is emitted from each LED 3 is refracted and scattered effectively and hence no chrominance or luminance unevenness occurs even if the distance between the LEDs 3 and the light incidence surface 1c is short. Therefore, an inexpensive backlight capable of accommodating frame width reduction can be provided. Further, since the LEDs 3 are used as light sources, a backlight can be obtained that is more environment-friendly than conventional backlights using a cold cathode fluorescent tube containing mercury. Still further, an inexpensive liquid crystal display device having superior display characteristics can be obtained by disposing a liquid crystal panel above the backlight according to this embodiment.

Embodiment 2

Figure 5:
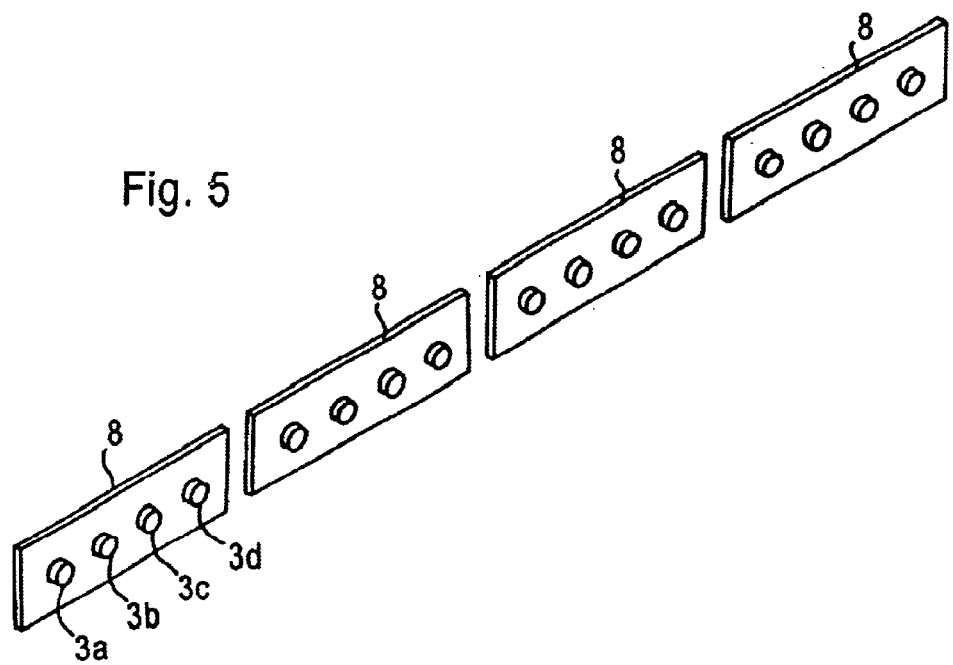
FIG. 5 is a perspective view of LED units according to a second embodiment of the invention.

The first embodiment is directed to the backlight having the single, long and narrow LED board 2 in which the LEDs 3 are arranged along the longitudinal direction x of the light incidence surface 1c. In a second embodiment of the invention, plurality of LED units are used instead of the LED board 2. FIG. 5 is a perspective view of LED units 8 according to this embodiment. In each LED unit 8, different kinds of LEDs 3a, 3b, 3c, and 3d are combined so as to produce white light as a whole. For example, all the LEDs 3a, 3b, 3c, and 3d are monochrome LEDs in which the LEDs 3a and 3d emit red light, the LED 3b emits green light, and the LED 3c emits blue light. A backlight that provides the same effect as the backlight according to the first embodiment can be formed by using, instead of the LED board 2 shown in FIG. 1, the LED units 8 that are arranged so as to measure a prescribed size and disposing the prism member 5 between the LED units 8 and the light guide plate 1.

Figure 8:
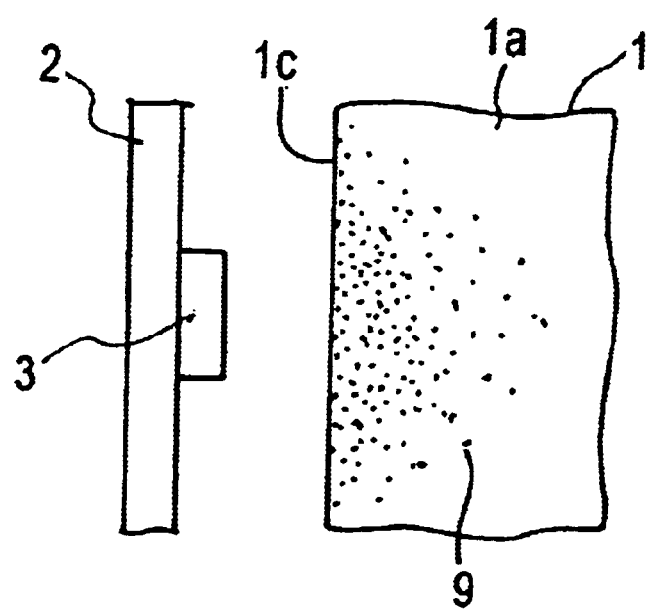
FIG. 8 is a top view showing part of the backlight according to the third embodiment.
Figure 9:
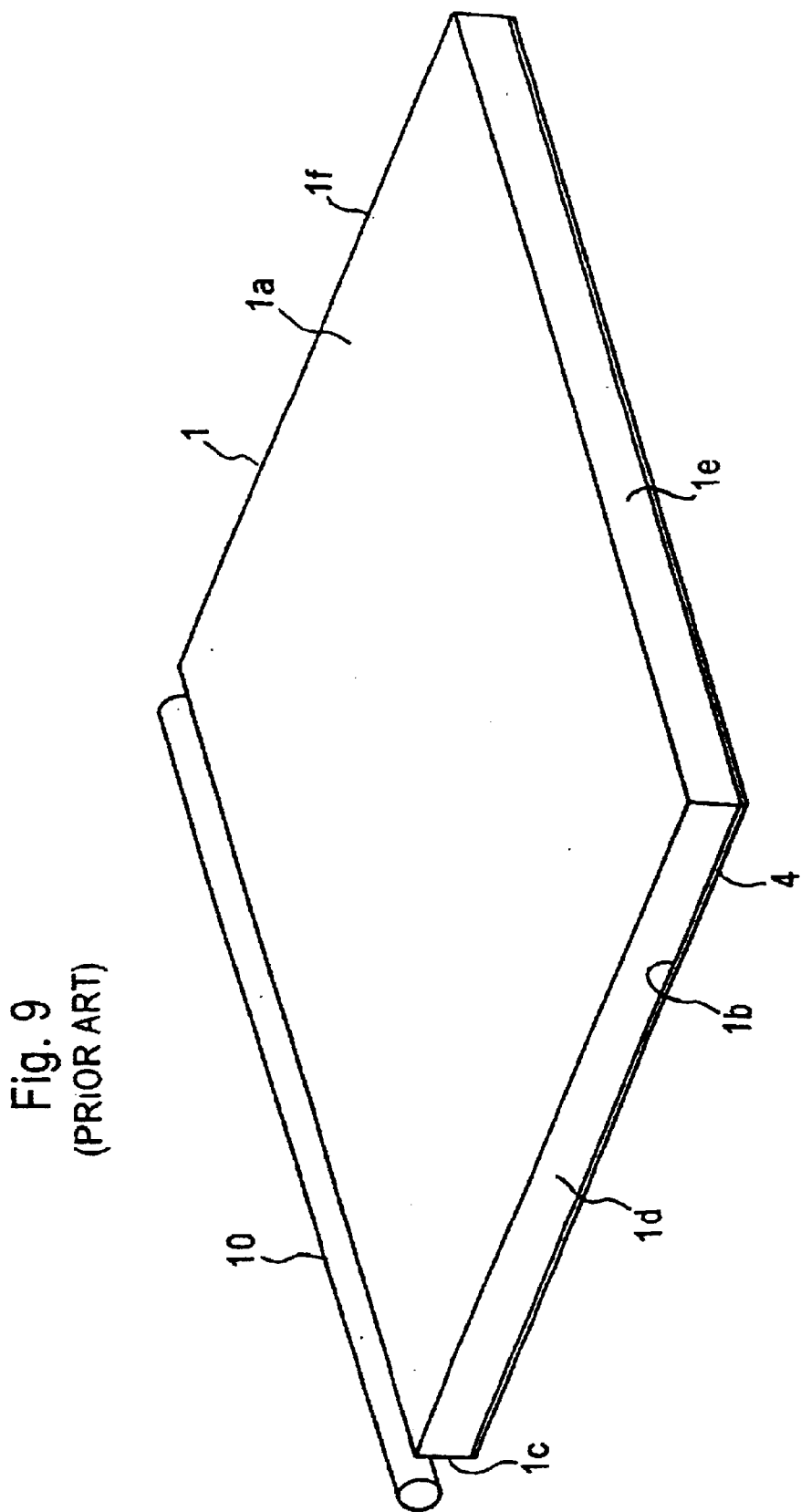
FIG. 9 is a perspective view of a conventional backlight using a cold cathode fluorescent tube.
Figure 10:
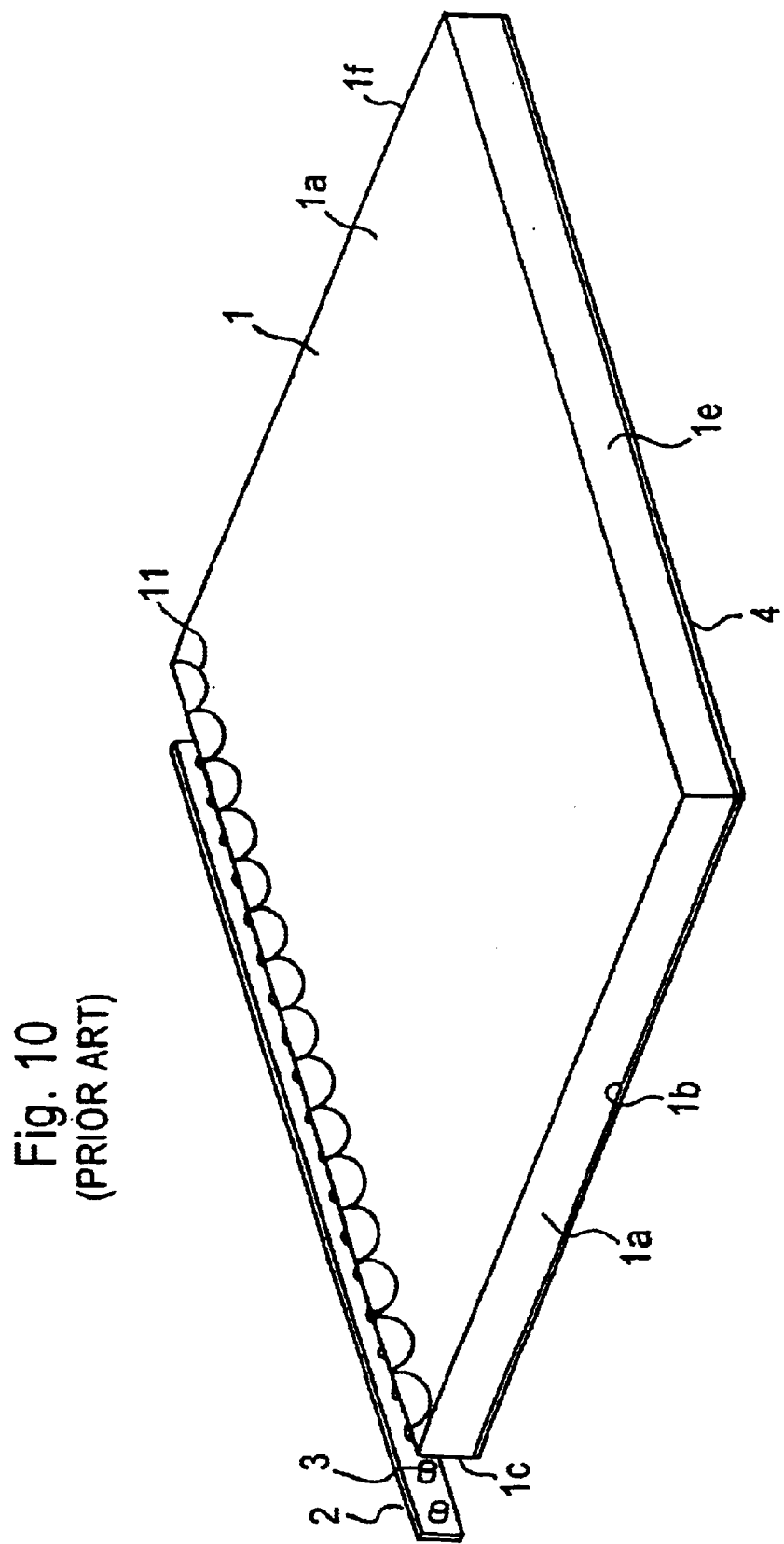
FIG. 10 is a perspective view illustrating a problem that arises when LEDs are used in a conventional large-size backlight.

In this embodiment, the number of LED units 8 can easily be increased or decreased so as to be suitable for the size of a liquid crystal display device, in other words, the size of a light incidence surface 1c to be brought into proximity to the LEDs 3. The ratio among the numbers of LEDs of the respective colors remains approximately the same even if the inch number of the liquid crystal display device varies. Therefore, adaptation to liquid crystal display devices of various sizes can be made by increasing or decreasing the number of LED units 8. For example, where the R:G:B ratio is set at 2:1:1, two red LEDs, one green LED, and one blue LED are used for a 4-inch liquid crystal display device and 20 red LEDs, 10 green LEDs, and 10 blue LEDs are used for a 15-inch device. That is, one LED unit 8 shown in FIG. 5 is used for the 4-inch liquid crystal display device and 10 LED units 8 shown in FIG. 8 are used for the 15-inch device.

In the case of the LED board 2 shown in FIG. 1, it is necessary to design and manufacture a new LED board 2 every time the size of the liquid crystal display device is changed, which is costly. In contrast, this embodiment can reduce the designing and manufacturing costs of the LED board 2.

Figure 6A:
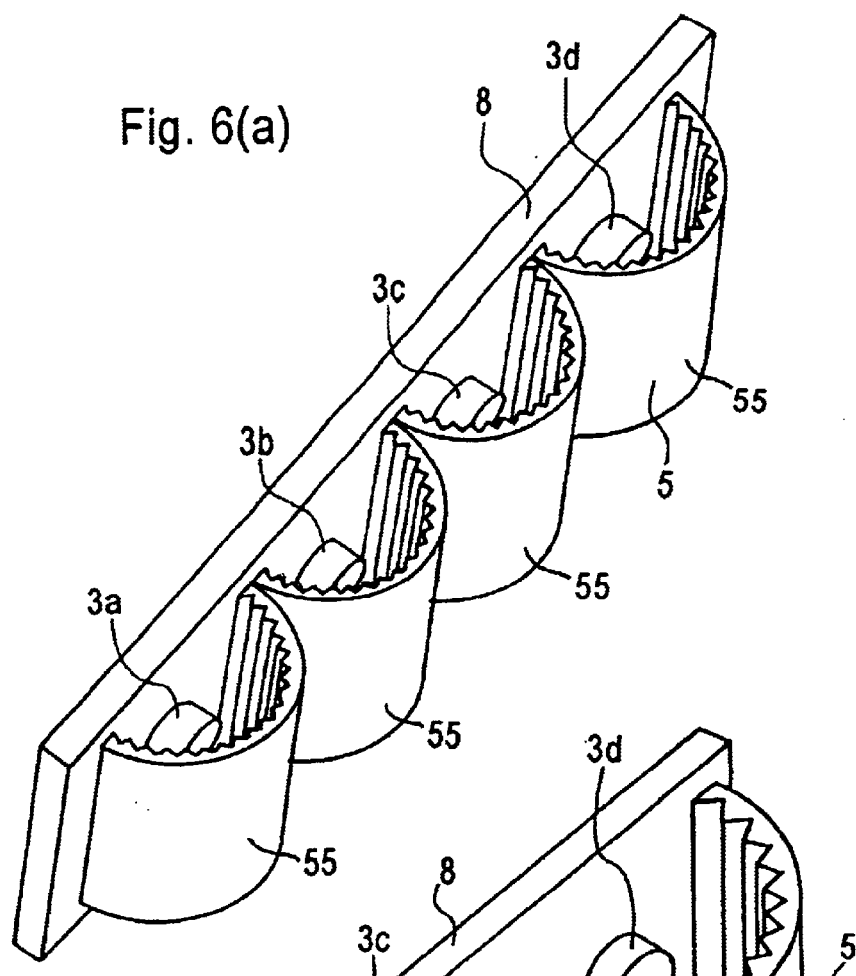
FIGS. 6(a) and 6(b) are perspective views of respective LED units according to the second embodiment.
Figure 6B:
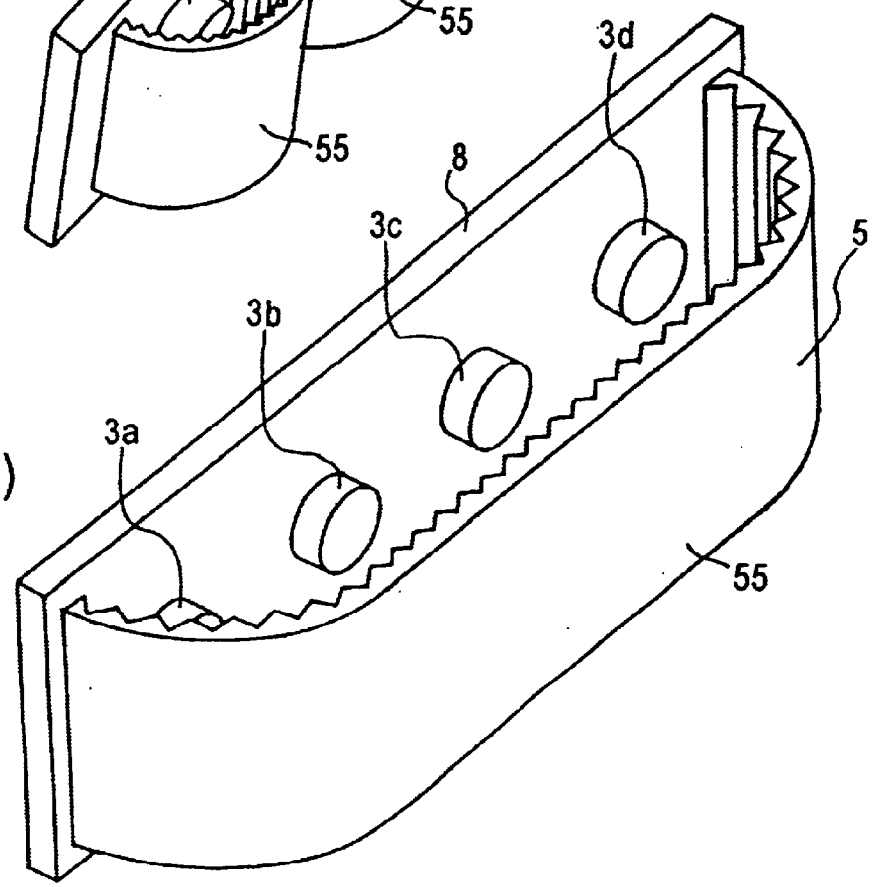

As shown in FIGS. 6(a) and 6(b), the LEDs 3a, 3b, 3c, and 3d of each LED unit 8 may be surrounded by a prism sheet 55 that is similar to the prism sheet 50 that is used in the first embodiment. The prism sheet 55 is formed as a part of cylindrical shape. In this case, light that is emitted from the LED unit 8 is scattered by the prism member 55, which makes it possible to provide a backlight that is free of chromaticity or luminance unevenness. The details of the prism member 55 will not be described because they are approximately the same as in the first embodiment. Although it is desirable that each of the LEDs 3a, 3b, 3c, and 3d be individually surrounded by a dedicated prism member 55 as shown in FIG. 6(a), the manufacturing cost can be reduced by attaching the prism member 55 to the LED unit 8 so as to surround all the LEDs 3a, 3b, 3c, and 3d as shown in FIG. 6(b).

The use of such a highly versatile LED unit 8 that is mounted with the prism member(s) 5 in advance makes the manufacturing cost much lower and the manufacturing period much shorter than in the case of FIG. 1 in which the LED board 2 and the prism member 5 are separate parts and they need to be designed for each size of a liquid crystal display device.

Embodiment 3

FIG. 7 is a perspective view showing a backlight as a surface light source device according to a third embodiment of the invention. Components in FIG. 7 having the same or corresponding components in FIG. 1 are given the same reference symbols as the latter. As shown in FIG. 7, the backlight according to this embodiment is mainly composed the light guide plate 1 and the LED board 2. The shape of the light guide plate 1 and the LED board 2 are the same as in the first embodiment and hence will not be described. In this embodiment, a light diffusing member 9 is mixed in a light incidence portion of the light guide plate 1 that is close to the light incidence surface 1c, whereby light beams that are emitted from LEDs 3 are diffused and mixed in color until reaching the light-emitting surface 1a of the light guide plate 1. As a result, chrominance or luminance unevenness is prevented.

As shown in FIG. 8, it is desirable that the light diffusing material 9 be mixed in the light guide plate 1 in such a manner that its density increases toward the light incidence surface 1c. The light diffusing material 9 is a powder-like substance having low light absorptance and high light reflectance, such as titanium oxide. The light diffusing material 9 can be mixed into the light guide plate 1 by, for example, injection molding called color mixing molding.

According to this embodiment, chrominance or luminance unevenness can be prevented by mixing the light diffusing material 9 in the light incidence portion of the light guide plate 1 that is close to the light incidence surface 1c. Because the number of parts of the backlight is smaller than in the first embodiment, this embodiment enables further frame width reduction.

The above-described first to third embodiments may be implemented either singly or in combination. When they are implemented in combination, the light scattering effect can be enhanced. For example, in the first or second embodiment, the light diffusing material 9 may be mixed in the light incidence portion of the light guide plate 1 in the manner described in the third embodiment.

Although each of the first to third embodiments is directed to the backlight for a liquid crystal display device, the invention is generally applied to a surface light source device for conversion from point light sources into a surface light source and hence the application range of the invention is not limited to backlights and encompasses front lights.

Each of the first to third embodiments is directed to the case of using LEDs of the three colors (red, green, and blue). However, the invention is intended to prevent chrominance or luminance unevenness by mixing together light beams coming from point light sources in a region having a short length. Therefore, the invention can also be applied to a case that LEDs of a single color are arranged or a case that LEDs of four or more colors are used.

The point light sources are not limited to LEDs. The invention can be applied to cases that the point light sources are light-emitting elements whose light-emitting area is sufficiently smaller than that of a surface light source device. An example of such a light emitting element is an optical fiber.

Additional features of the surface light source device according to this invention and their technical merits are bellow.

In one additional feature, the prism sheet is such that a cross section, taken parallel with the light-emitting surface of the light guide plate, of each of the prisms generally assumes a substantial triangle having an apex on the side closer to the point light sources.

According to this feature, light that is emitted from each point light source is expanded in the longitudinal direction of the light incidence surface while part of the emitted light that is incident on a portion of the light incidence surface that faces the point light source is weakened properly. As a result, chrominance or luminance unevenness can be prevented.

In an another additional feature, the apex of each of the prisms of the prism sheet has an apical angle that is in a range of 90°±20°.

In this feature, the apical angle setting enhances the prism sheet's effect of expanding light that is emitted from each point light source, to both sides in the longitudinal direction of the light incidence surface.

In an another additional feature, the ridge lines of adjacent prisms of the prism member have an interval that is less than 1 mm.

In this feature, the prism sheet assumes a thin sheet form and hence can be disposed without the need for increasing the distance between the point light sources and the light incidence surface. This makes it easier to provide an inexpensive surface light source device capable of accommodating frame size reduction of a display device.

In an another additional feature, the ridge lines of the prisms of the prism sheet are inclined from the longitudinal direction of the light incidence surface by 30° to 90°.

In this feature, the light scattering effect of the prism sheet can be adjusted by adjusting the inclination angle in accordance with the interval between adjacent point light sources and the distance between the point light sources and the light incidence surface. This makes it possible to obtain a required light scattering effect.

In an another additional feature, the surface of the prism member that is opposed to the light incidence surface is provided with means for preventing contact between the prism sheet and the light incidence surface.

In this feature, an air layer is formed between the prism sheet and the light incidence surface, the prism sheet can exhibit desired performance.

In an another additional feature, the light source assembly includes a light source unit in which different kinds of point light sources are provided so as to produce white light as a whole.

This feature makes it possible to produce white light using inexpensive monochrome point light sources and thereby provide an inexpensive surface light source device.

In an another additional feature, the prism member includes a plurality of the prism sheets and each of prism sheets surrounds each of the point light sources.

In this feature, light beams that are emitted from the point light source are individually scattered by each prism sheet. As a result, a surface light source device that is free of chrominance or luminance unevenness can be obtained. Where the point light sources are surrounded with the respective prism sheets, chrominance or luminance unevenness can be prevented reliably.

In an another additional feature, the light source assembly includes a plurality of light source units are disposed close to the light incidence surface, in each light source units different kinds of point light sources are provided so as to produce white light as a whole.

In this feature, by increasing or decreasing the number of light source units in accordance with the size of the light incidence surface, the point light source units can be used for products having various sizes. The use of such point light source units that are high in general versatility makes it possible to manufacture, at a low cost, a surface light source device that can be used for a large-screen display device.

Additionally, this feature makes it possible to produce white light using inexpensive monochrome point light sources and thereby provide an inexpensive surface light source device.

In an another additional feature, the prism member includes a plurality of the prism sheets and each of prism sheets surrounds all point light sources of each of the light source units.

In this feature, light beams that are emitted from all point light sources of each of light units are totally scattered by each prism sheet. As a result, a surface light source device that is free of chrominance or luminance unevenness can be obtained. Where all point light sources of the light unit are surrounded with the respective prism sheets, chrominance or luminance unevenness can be prevented reliably.

In an another additional feature, a light diffusing material is mixed in a light incidence portion of the light guide plate that is close to the light incidence surface.

In an another additional feature, the light diffusing material is mixed in a incidence portion of the light guide plate in such a manner that its density increases toward the light incidence surface.

In this feature, the effect of preventing chrominance or luminance unevenness is enhanced by mixing the light diffusing material in such manner that its density increases toward the light incidence surface.

In an another additional feature, the point light sources are light-emitting diodes, a surface light source device that is more environment-friendly than conventional ones using a cold cathode fluorescent tube containing mercury can be obtained.

What is claimed is:
1. A surface light source device comprising:
  a thin rectangular light guide plate having a pair of major surfaces that are opposed to each other and a plurality of side surfaces that connect the pair of major surfaces, one of the major surfaces forming a light-emitting surface, the other major surface being provided with light reflecting means and one of the side surfaces forming a light incident surface;

a light source assembly including a plurality of point light sources so as to be arranged along a longitudinal direction of the light incidence surface of the light guide plate; and a prism member disposed between the light source assembly and the light incidence surface, the prism member including a prism sheet consisting of a plurality of minute prisms that are arranged along an arrangement direction of the point light sources and that have a function of refracting light that is emitted from each of the point light sources and thereby inputting, to the light incidence surface, refracted light that is scattered to both sides in the longitudinal direction of the light incidence surface, the prism sheet being opposed to the point light sources, and the light incidence surface with air layers interposed in between, respectively.

2. The surface light source device according to claim 1, wherein a cross section, taken parallel with the light-emitting surface of the light guide plate, of each of the prisms of the prism sheet generally assumes a substantial triangle having an apex on a side closer to the point light sources.

3. The surface light source device according to claim 2, wherein the apex of each of the prisms of the prism sheet has an apical angle that is in a range of 90°±20°.

4. The surface light source device according to claim 2, wherein ridge lines of adjacent prisms of the prism sheet have an interval that is less than 1 mm.

5. The surface light source device according to claim 2, wherein ridge lines of the prisms of the prism sheet are inclined from the longitudinal direction of the light incidence surface by 30° to 90°.

6. The surface light source device according to claim 1, wherein a surface of the prism sheet that is opposed to the light incidence surface is provided with means for preventing contact between the prism sheet and the light incidence surface.

7. The surface light source device according to claim 1, wherein the light source assembly includes a light source unit in which different kinds of point light sources are provided so as to produce white light as a whole.

8. The surface light source device according to claim 7, wherein the prism member includes a plurality of the prism sheets and each of the prism sheets surrounds each of the point light sources.

9. The surface light source device according to claim 1, wherein the light source assembly includes a plurality of light source units are disposed close to the light incidence surface, in each point light source unit different kinds of point light sources are provided so as to produce white light as a whole.

10. The surface light source device according to claim 9, the prism member includes a plurality of the prism sheets and each of the prism sheets surrounds all point light sources of each of the point light source units.

11. The surface light source device according to claim 1, wherein a light diffusing material is mixed in a light incidence portion of the light guide plate that is close to the light incidence surface.

12. A surface light source device comprising:

a thin rectangular light guide plate having a pair of major surfaces that are opposed to each other and four side surfaces that connect the pair of major surfaces, one of the major surfaces forming a light-emitting surface, the other major surface being provided with light reflecting means and one of the side surfaces forming a light incident surface;

a light source assembly including a plurality of point light sources that are disposed close to the light incident surface of the light guide plate so as to be arranged along a longitudinal direction of the light incidence surface; and a light diffusing material that is mixed in a light incidence portion of the light guide plate that is close to the light incidence surface, wherein the light diffusing material is mixed in such a manner that its density increases toward the light incidence surface.

13. The surface light source device according to claim 1, wherein the point light sources are light-emitting diodes.

14. The surface light source device according to claim 12, wherein the point light sources are light-emitting diodes.

15. A liquid crystal display device comprising:

the surface light source device according to any one of claims 1 to 12 and 13 to 14; and a liquid crystal panel provided above the light-emitting surface of the light guide plate in the surface light source device.

* * * * *